UNITED STATES PATENT OFFICE.

CARL VON DER LINDE, OF CREFELD, GERMANY.

PROCESS OF PURIFYING TIN SCRAPS PREPARATORY TO DETINNING THE SAME.

996,380.  Specification of Letters Patent.  Patented June 27, 1911.

No Drawing.  Application filed December 5, 1910.  Serial No. 595,544.

*To all whom it may concern:*

Be it known that I, CARL VON DER LINDE, a citizen of the Empire of Germany, residing in Crefeld, in the Kingdom of Prussia and Empire of Germany, have invented certain new and useful Improvements in Processes of Purifying Tin Scraps Preparatory to Detinning the Same, of which the following is a specification.

The extraction of tin from waste tin scraps presupposes, as is well known, the purification of the scraps to be treated, from fatty and oily substances, as well as from varnish, polish, paint, dirt, paper, straw, small pieces of wood, etc. This purification was hitherto carried out in separate washing apparatus and consisted in the material to be deprived of tin, being packed, in the loosest and bulkiest state possible, into baskets or rotating drums, and in the filled baskets or drums being dipped into reservoirs filled with the washing liquid, in which both the washing liquid and the material to be treated were exposed to an energic motion. Such washing liquids were in the form of alkaline lyes for removing fatty and oily substances, and warm and cold water for the subsequent rinsing. In that way, a kind of elutriating action was obtained, that is to say, not only were impurities soluble in the washing liquid, such as fat and oil, removed from the material to be treated, but also impurities insoluble in the washing liquid and adhering to the said material, such as paint, paper, varnish, polish, straw, sand and dirt, were separated and removed from the material to be treated by a kind of mechanical process. On account of the great bulk of the material, this treatment necessitated, as will be readily understood, the use of large tanks and mechanical appliances, and therefore large installations and working expenditure.

The object of the process according to this invention is to subject the material to be treated, to washing, not as hitherto in a bulky loose state, but in compact form, for instance in the form of packets, such as are at present already used after the washing has been done, when extracting tin by means of chlorin, in order that the packets should be suitable for subsequent melting in a furnace.

The said new process consists in the packets being piled up in a closed vessel and in forcing the washing liquid through the packets repeatedly by pressure or drawing it through them by the action of a vacuum or suction. The great advantage of this new process which does away with the installations hitherto required, necessitating a great deal of space and expense, is obvious. Hitherto the carrying out of this process has been prevented by the fact that a complete purification of the material treated cannot be effected, as the compressed material exercises a kind of filter-action and holds back the undissolved impurities. I have found, however, that although such a complete purification as that formerly obtained with the material in the loose form, cannot be obtained by my new process and although in fact the impurities such as paper, wood, sand, etc., which are insoluble in the lye and in the water actually remain in the solid packets, these impurities, insoluble in the washing liquid, do not form an obstacle by their mere presence in the packets, to the subsequent complete tin-extraction process by chlorin as long as the impurities are completely deprived of fat and oil and removed from the surface of the material to be treated. This discovery is a surprising one, for hitherto it was generally considered that the material to be deprived of tin, must be completely purified from all foreign matter such as dirt, fat, ~~etc., if it~~ was desired to bring about a complete extraction of tin and so obtain an unobjectionable product. As a consequence of this discovery, it is possible to dispense with the washing of the material in a bulky loose state, and with the large and costly apparatus formerly necessary, and to effect the purification of the material in compressed packet-form. Thus, on the one hand, space and money are economized, and on the other hand, it is possible to have the purification-process carried out in the same vessel in which the drying and chlorination are subsequently effected.

The process of forcing liquids by pressure or drawing them by suction or vacuum through packets formed of the material to be deprived of tin is well known in itself, both for the chlorination and for the subsequent washing to get rid of the last traces of the tetra-chlorid of tin, and such subsequent washing and drying has been carried out in the vessels in which the chlorination has taken place. But although it might have been thought obvious to apply that process to the first washing or purification of the material from which the tin was to be extracted, the above mentioned objections have prevented such an application of the said well known process to the present purpose. The fact that the said cheap and simple process for washing the material from which tin is to be extracted has not been hitherto applied in practice, and that instead of it was used a considerably more expensive process with a large and costly installation, indicates that it was considered that the apparently only complete washing that could be obtained with that process, could never be sufficient for a subsequent complete extraction of tin by means of chlorin. As a matter of fact, the surface of the material to be treated, does not get, in the new process, anything like the bright appearance which is obtained when washing the materials to be treated in a bulky loose state in separate rotating or movable apparatus. On the contrary, owing to the filtering action of the packets, the impurities such as paper, wood, sand, varnish, etc., which are insoluble in the lye although they are rendered soft and are separated from the surface, remain in the packets, and it is therefore natural to assume from the experience generally obtained hitherto with insufficiently purified material that such an apparently insufficient washing process in packet-form was unsuitable for subsequent extraction of tin. Experiments have proved that all impurities do not constitute an obstacle to the complete extraction of tin, but that the chief points are, with the assistance of the washing liquid, firstly, to dissolve completely and to remove the oily and fatty impurities, and secondly, to render the surface of the material to be treated, as free as possible from mineral and mechanical impurities, such as varnish, polish, sand, dirt, straw, small pieces of wood, etc. The fact that the latter remain in the packets in the separated state, is as already stated, of no importance for the subsequent chlorination-process, provided the impurities have been deprived of all oil and fat, which is completely effected by the present process.

I claim:

1. The process herein described of washing tin scrap and similar material from which tin is to be extracted, which consists in compressing the material into bundles or packets and then forcing the washing liquid before chlorination through the compressed material.

2. The process herein described of washing tin-scrap or similar material from which tin is to be extracted, which consists in compressing the material into bundles or packets, then forcing the washing liquid before chlorination through the compressed material, and subsequently carrying out the drying and chlorination of the purified material in the same vessel in which the washing was effected.

In testimony, that I claim the foregoing as my invention, I have signed my name in presence of two subscribing witnesses.

CARL von der LINDE.

Witnesses:
ELISE KODBURCH,
HENRY QUADFLIEG.